June 24, 1958   N. J. SLUTZKY   2,840,332
ADJUSTABLE FITTINGS
Filed Sept. 18, 1953
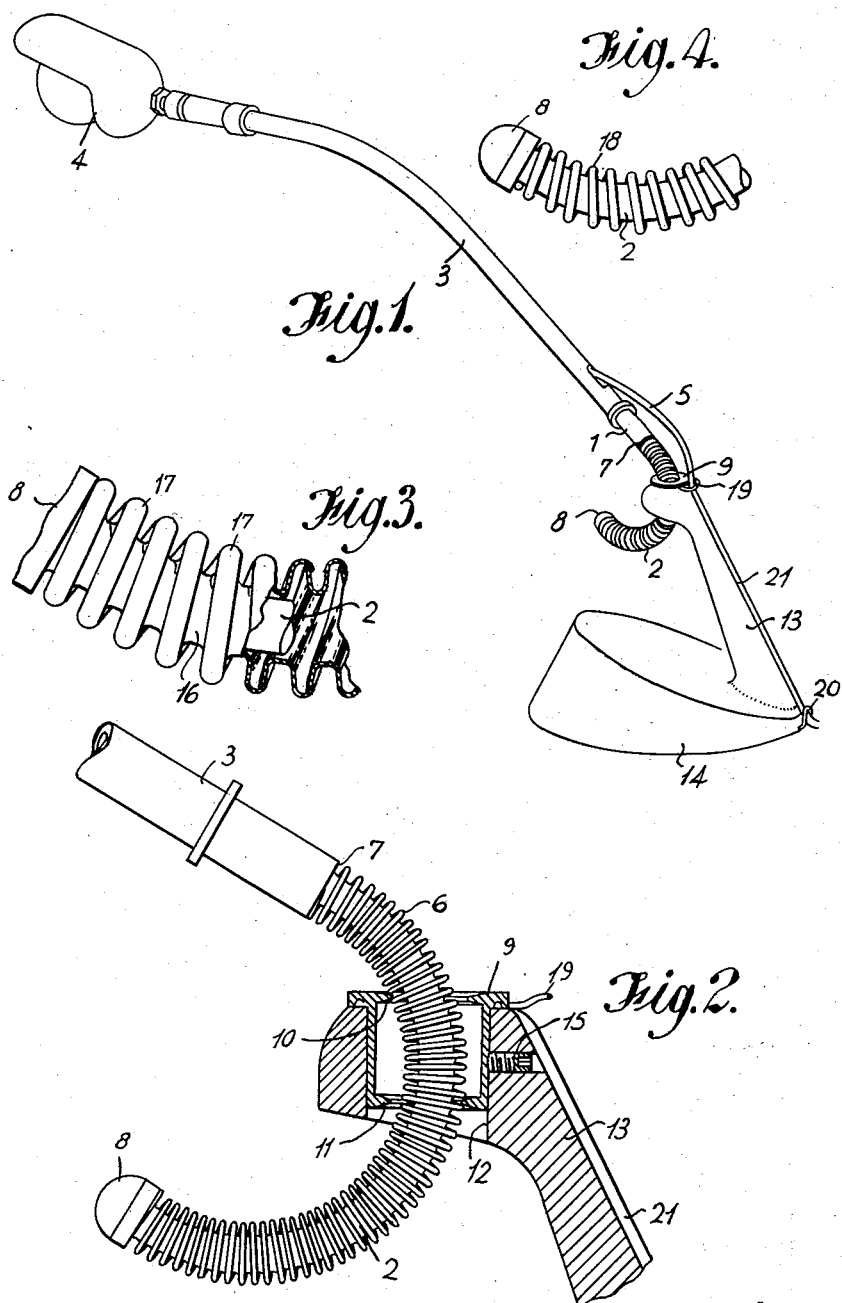
Inventor
Naum Julius Slutzky
By
Holcomb Wetherill Brisebois
Attorney

United States Patent Office 2,840,332
Patented June 24, 1958

2,840,332

ADJUSTABLE FITTINGS

Naum Julius Slutzky, London, England

Application September 18, 1953, Serial No. 381,021

5 Claims. (Cl. 248—124)

The present invention relates to adjustable fittings and particularly, though not specifically, to adjustable fittings for electric lamps.

An adjustable fitting according to the invention comprises a curved member approximating to the arc of a circle, a ring or collar adapted to surround said curved member and form a means whereby the fitting may be secured to a suitable support, and means on said curved member adapted to cooperate with the ring or collar so as to lock the two parts together in any one of a variety of positions, the weight of the curved member acting to retain the parts in a selected position.

The means on the curved member may comprise a sheath fitting over said curved portion and provided with a radially-projecting helix or, alternatively, it may comprise a suitable strip or filamentary material loosely wound thereon, whereby an edge of the ring or collar may be caused to engage selectively between any two convolutions of the helix or the material.

The lamp may be secured to one end of the curved member or an extension thereof. The curved member and/or any extension of it may be hollow to receive leads from an electric lamp used on the device.

The collar or ring may be in two parts, if desired, and is connected to a bracket whereby the device may be attached to a suitable object to serve as an adjustable lamp standard, table lamp or wall lamp, in which latter case said bracket could be affixed to a plate for attachment to a wall.

In order that the invention may be more clearly understood, reference will now be made to the accompanying drawings which illustrate one embodiment thereof by way of example and in which:

Fig. 1 shows a perspective view of a table lamp with an adjustable fitting according to the invention.

Fig. 2 shows a detail of the curved member in association with the ring or collar, partly in section, and Figs. 3 and 4 show sections through two variations of locking means and the curved member.

In the drawings, a cylindrical tubular member 1 of a suitable metal, such as brass, has a curved portion 2 at one end resembling the curved handle of a walking stick or umbrella and at its other end has an extension 3 carrying any desired form of electric lamp socket, lamp and shade, generally indicated at 4, the leads 5 for which are passed through the extension. The curved portion 2 is surrounded by helically-formed covering generally indicated at 6, a shoulder 7 being provided at one end and a stop 8 at the other to hold the covering in position. A cylindrical collar 9 is provided through which the curved portion is passed and has a pair of inwardly-directed flanges 10, 11, the internal diameters of which are considerably larger than the outside diameter of the spiral convolutions of the covering. For example, they may be approximately 1½ times that diameter.

The collar 9 is located within the bore 12 of a bracket 13 associated with a base 14, and the difference in the diameters of the parts mentioned allows the curved portion to be pushed through the collar quite easily. In any one selected position, the edge of the flange 11 of the collar 9 will engage between adjacent convolutions of the covering and the weight of the device in conjunction therewith will cause the curved part 2 to be securely gripped at the chosen position. The diametrically opposite portion of the curved section will rest on the opposite edge of the flange 10 of the collar. The collar 9 may be locked in the bore 12 by a screw 15.

The helical covering member 6 may be in the form of a sheath 16 having a radially-projecting helix 17 as shown in Fig. 3 or it may be in the form of a strip of filamentary material such as wire 18 loosely wound on the curved portion, as shown in Fig. 4. The bracket 13 may be provided with clips 19, 20 through which the electrical leads are passed and may also be provided with a groove 21 to allow the electrical leads to lie flat.

In a modification the collar 9 may be provided with a piston or similar pressure device working through the wall of the bore and acting to press the curved member 2 positively against the flanges 10 and 11.

Various modifications to the specific details given could be made without departing from the scope of the invention. For example, the curved member 2 and the collar or ring 9 may be polygonal. Furthermore, the surface of the curved member 2 may be provided with a series of notches, grooves or corrugations for cooperation with an inner edge of the ring or collar.

Although the invention has been specifically described in connection with an adjustable lamp fitting it could equally well be applied to other adjustable fittings, for example, for microphones, scientific equipment such as retorts or test tubes and so on.

I claim:

1. An adjustable support comprising a supporting base member capable of standing freely, the upper part of said support member being shaped to form a cylinder, an annular collar located within and secured with respect to said cylinder, two inwardly-directed flanges located at the upper and lower extremities of said collar respectively, a rigid support arm one end of which is curved into a crook, and closely spaced radial projections on said crook, said crook being loosely mounted and slidable within said collar and adjustably positionable therewithin and locatable at a selected position with a part of said upper flange engaged between two adjacent ones of said projections on one side of said crook and a part of said lower flange engaged between two others of said projections diametrically opposed to said first-mentioned adjacent projections, said flanges being bevelled to form edges, said edges having substantially the same thickness as the distance between any two of said projections.

2. An adjustable support comprising a supporting base member capable of standing freely, the upper part of said support member being shaped to form a cylinder, an annular collar located within and secured with respect to said cylinder in a substantially vertical position, two inwardly-directed flanges located at the upper and lower extremities of said collar respectively, a rigid support arm one end of which is curved into a crook, and a filamentary helix having closely spaced convolutions mounted on said crook, said crook being loosely mounted and slidable within said collar and adjustably positionable therewithin and locatable at a selected position with a part of said upper flange engaged between two adjacent convolutions of said helix member on one side of said crook and a part of said lower flange engaged between two others of said convolutions diametrically opposed to said first-mentioned convolutions, said flanges being bevelled to form edges, said edges having substantially the same thickness as the distance between any two of said convolutions.

3. An adjustable support comprising a supporting base member capable of standing freely, the upper part of said support member being shaped to form a cylinder, an annular collar located within and secured with respect to said cylinder in a substantially vertical position, two inwardly-directed flanges located at the upper and lower extremities of said collar respectively, a rigid support arm one end of which is curved into a crook, stop members at the two ends of said crook, a sheath member loosely mounted in said crook between said stop members and formed with a radially-projecting helix having closely-spaced convolutions, said crook being loosely mounted and slidable within said collar and adjustably positionable therewithin and locatable at a selected position with a part of said upper flange engaged between two adjacent convolutions of said helix on one side of said crook and a part of said lower flange engaged between two others of said convolutions diametrically opposed to said first-mentioned adjacent projections, said flanges being bevelled to form edges, said edges having substantially the same thickness as the distance between any two of said convolutions.

4. An adjustable support comprising a supporting base member capable of standing freely, the upper part of said support member being shaped to form a cylinder, an annular collar located within and secured with respect to said cylinder in a substantially vertical position, two inwardly-directed flanges located at the upper and lower extremities of said collar respectively, a rigid support arm one end of which is curved into a crook, stop members at the two ends of said crook, and a wire coil of springy material having closely-spaced convolutions, said crook being loosely mounted and slidable within said collar and adjustably positionable therewith and locatable at a selected position with a part of said upper flange engaged between two adjacent convolutions on one side of said crook and a part of said lower flange engaged between two others of said convolutions diametrically opposed to said first-mentioned adjacent projections, said flanges being bevelled to form edges, said edges having substantially the same thickness as the distance between any two of said convolutions.

5. An adjustable table lamp comprising a supporting base member capable of standing freely, the upper part of said support member being shaped to form a cylinder, an annular collar located within and secured with respect to said cylinder, two inwardly directed flanges located at the upper and lower extremities of said collar respectively, a rigid support arm one end of which is curved into a crook, closely spaced radial projections on said crook, said crook being loosely mounted and slidable within said collar and adjustably positionable therewithin and locatable at a selected position with a part of said upper flange engaged between two adjacent ones of said projections on one side of said crook and a part of said lower flange engaged between two others of said projections diametrically opposed to said first-mentioned adjacent projections, said flanges being bevelled to form edges, said edges having substantially the same thickness as the distance between any two of said projections, and a lamp fitting at the other end of said support arm.

References Cited in the file of this patent
UNITED STATES PATENTS

| | | |
|---|---|---|
| 426,163 | Bergmann | Apr. 22, 1890 |
| 1,054,892 | Anklam | Mar. 4, 1913 |
| 1,356,745 | Schwartz et al. | Oct. 26, 1920 |
| 1,360,559 | Monahan | Nov. 30, 1920 |
| 2,133,020 | Fehrenbach | Oct. 11, 1938 |
| 2,335,296 | Miller | Nov. 30, 1943 |
| 2,456,792 | Ohm | Dec. 21, 1948 |
| 2,721,719 | Giese et al. | Oct. 25, 1955 |